United States Patent
Karin et al.

(10) Patent No.: US 10,129,295 B2
(45) Date of Patent: Nov. 13, 2018

(54) CLUSTERING APPROACH FOR DETECTING DDOS BOTNETS ON THE CLOUD FROM IPFIX DATA

(71) Applicant: Microsoft Technology Licensing, LLC, Redmond, WA (US)

(72) Inventors: Omer Karin, Tel Aviv (IL); Royi Ronen, Tel Aviv (IL); Hani Neuvirth, Tel Aviv (IL); Roey Vilnai, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 15/253,586

(22) Filed: Aug. 31, 2016

(65) Prior Publication Data
US 2018/0063188 A1    Mar. 1, 2018

(51) Int. Cl.
*H04L 29/06*     (2006.01)
*G06F 17/30*     (2006.01)
*G06N 99/00*     (2010.01)

(52) U.S. Cl.
CPC .... *H04L 63/1458* (2013.01); *G06F 17/30598* (2013.01); *G06F 17/30705* (2013.01); *G06N 99/005* (2013.01); *H04L 63/1425* (2013.01); *H04L 63/1466* (2013.01); *H04L 2463/144* (2013.01)

(58) Field of Classification Search
CPC ......... H04L 63/09; G06F 21/55; G06F 17/30; G06F 17/30598; G06F 17/30705
See application file for complete search history.

(56) References Cited

U.S. PATENT DOCUMENTS

| | | | |
|---|---|---|---|
| 8,402,543 B1 | 3/2013 | Ranjan et al. | |
| 8,682,812 B1 | 3/2014 | Ranjan | |
| 8,745,737 B2 | 6/2014 | Thomas et al. | |
| 9,230,102 B2 | 1/2016 | Yu et al. | |
| 2011/0153811 A1* | 6/2011 | Jeong | H04L 63/14 709/224 |

(Continued)

FOREIGN PATENT DOCUMENTS

EP     2403187 A1     1/2012

OTHER PUBLICATIONS

Osanaiye, et al., "Ensemble-based multi-filter feature selection method for DDoS detection in cloud computing", In Journal on Wireless Communications and Networking, May 10, 2016, 14 pages.

(Continued)

*Primary Examiner* — Hadi S Armouche
*Assistant Examiner* — Shaqueal D Wade
(74) *Attorney, Agent, or Firm* — Workman Nydegger

(57) ABSTRACT

Use machine learning to train a classifier to classify entities to increase confidence with respect to an entity being part of a distributed denial of service attack. The method includes training a classifier to use a first classification method, to identify probabilities that entities from a set of entities are performing denial of service attacks. The method further includes identifying a subset of entities meeting a threshold probability of performing a denial of service attack. The method further includes using a second classification method, identifying similarity of entities in the subset of entities. The method further includes based on the similarity, classifying individual entities.

20 Claims, 3 Drawing Sheets

(56) References Cited

U.S. PATENT DOCUMENTS

| | | | |
|---|---|---|---|
| 2012/0054869 A1* | 3/2012 | Yen | H04L 29/12066 726/24 |
| 2012/0084860 A1* | 4/2012 | Cao | H04L 63/1441 726/23 |
| 2013/0104230 A1* | 4/2013 | Tang | G06F 21/552 726/23 |
| 2013/0191915 A1 | 7/2013 | Antonakakis et al. | |
| 2016/0028754 A1 | 1/2016 | Mota et al. | |
| 2016/0359897 A1* | 12/2016 | Yadav | H04L 63/1425 |

OTHER PUBLICATIONS

Wijesinghe, et al., "An Enhanced Model for Network Flow Based Botnet Detection", In Proceedings of the 38th Australasian Computer Science Conference, Jan. 27, 2015, pp. 101-110.

Amini, et al., "Botnet Detection using NetFlow and Clustering", In International Journal of Advances in Computer Science, vol. 3, Issue 2, No. 8, Mar. 2014, pp. 139-149.

Abuadlla, et al., "Flow-Based Anomaly Intrusion Detection System Using Two Neural Network Stages", In Journal of Computer Science and Information Systems, vol. 11, Issue 2, Jun. 2016, pp. 601-622.

Dillon, Connor, "Peer-to-Peer Botnet Detection Using NetFlow", In Master Thesis, Jul. 11, 2014, pp. 1-15.

Nguyen, et al., "DGA Botnet detection using Collaborative Filtering and Density-based Clustering", In Proceedings of the Sixth International Symposium on Information and Communication Technology, Dec. 3, 2015, pp. 203-209.

Sperotto, et al., "An Overview of IP Flow-Based Intrusion Detection", In Journal of IEEE Communications Surveys & Tutorials, vol. 12, No. 3, Jul. 2010, pp. 343-356.

Bhaya, et al., "Review Clustering Mechanisms of Distributed Denial of Service Attacks", In Journal of Computer Science, vol. 10, Issue 10, Oct. 2014, pp. 2037-2046.

Gu, et al., "BotMiner: clustering analysis of network traffic for protocol- and structure-independent botnet detection", In Proceedings of the 17th conference on Security symposium, Jul. 2007, 15 pages.

Salavador, S, et al: "Determining the Number of Clusters/Segments in Hierarchical Clustering/Segmentation Algorithms", Published Nov. 15, 2004, pp. 576-584.

"International Search Report and the Written Opinion issued in PCT Application No. PCT/US2017/048297", dated Oct. 12, 2017.

* cited by examiner

CLUSTERING APPROACH FOR DETECTING DDOS BOTNETS ON THE CLOUD FROM IPFIX DATA

BACKGROUND

Background and Relevant Art

Distributed Denial of Service (DDoS) attacks are amongst the most common forms of malicious network activity in computing systems. These attacks are performed by many entities (e.g., machines) organized into botnets that are synchronously flooding target entities with network traffic. In some environments, compromised entities on a cloud service might perform DDoS attacks. These attacks require many attackers to synchronously send a large volume of traffic to specific victim entities. This malicious traffic is often obfuscated in normal, legitimate traffic sent from the entity. However, botnets are configured to be retrieved efficiently from a very large number of mostly uncompromised entities on the cloud.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method for using machine learning to train a classifier for identifying or classifying entities to increase confidence with respect to an entity being part of a distributed denial of service attack. The method includes training a classifier to use a first classification method, to identify probabilities that entities from a set of entities are performing denial of service attacks. The method further includes identifying a subset of entities meeting a threshold probability of performing a denial of service attack. The method further includes using a second classification method, identifying similarity of entities in the subset of entities. The method further includes based on the similarity, classifying individual entities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein are able to detect botnet entities from IPFix records. To do so embodiments cluster a summary matrix for which an entry in the matrix represents the number of connections between each entity and each destination IP. The clustering may be performed using, for example, hierarchical clustering Embodiments can use a pre-trained classifier to determine for each entity the probability that it is performing DDoS. Clusters that contain entities that have a high probability of conducting DDoS are tagged as being part of a botnet.

This combined approach enables embodiments to efficiently detect botnets amongst hundreds of thousands of entities on the cloud.

Additional details are now illustrated.

Figure 1:
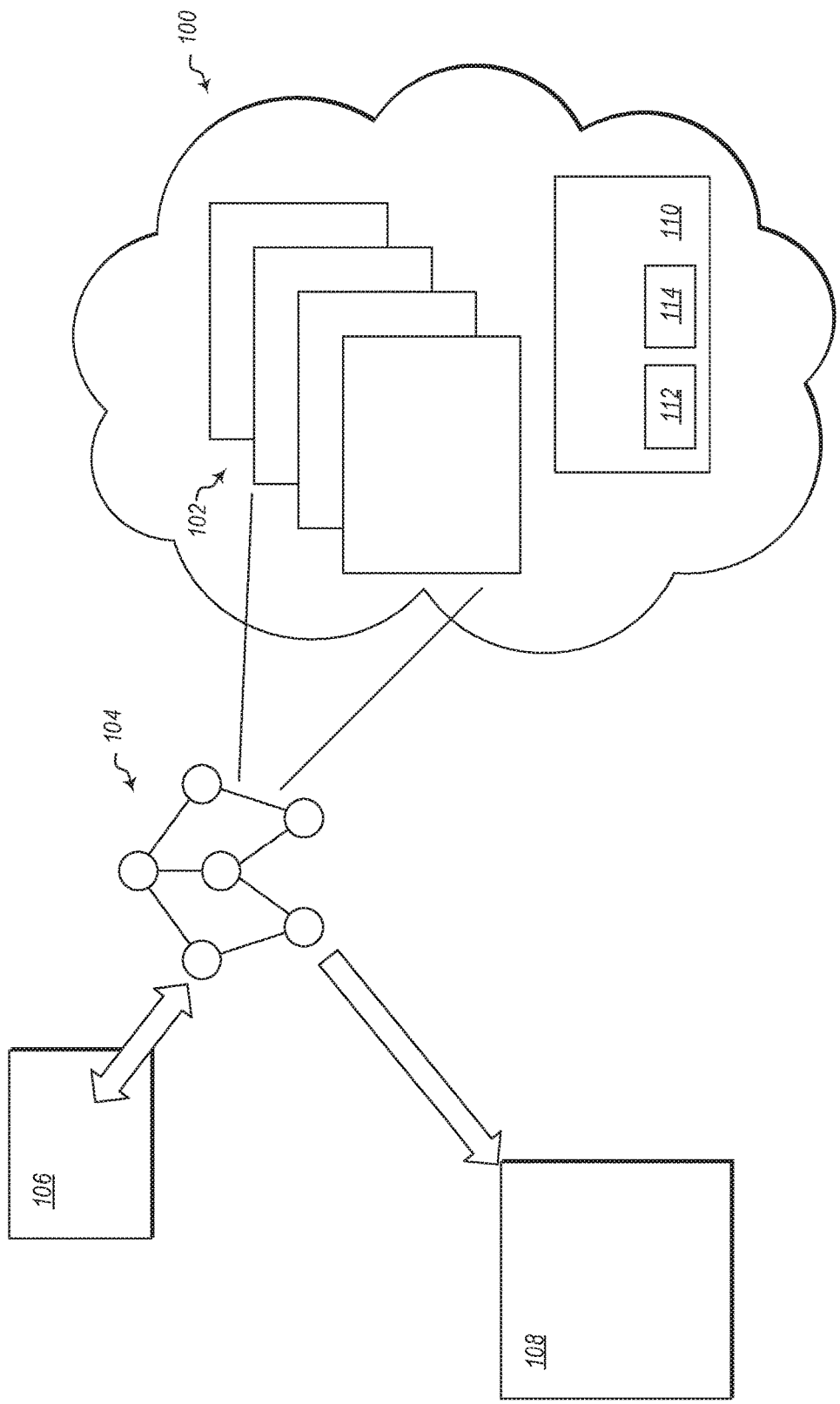
FIG. 1 illustrates a cloud system with entities performing DDoS attacks, and botnet classifiers.

Referring now to FIG. 1, a cloud environment 100 is illustrated. The cloud environment may host a plurality of entities 102. Entities in the plurality of entities 102 may be virtual machines or other cloud entities configured to perform work for subscribers to services provided by the cloud environment 100.

Some of the entities in the plurality of entities 102 may be compromised by having malicious software loaded onto them. These compromised entities may then form a botnet 104. The botnet 104 is typically under the control of a command and control 106. The command and control 106 can direct individual entities of the botnet 104 or the botnet 104 as a whole to perform various actions. For example, the command and control 106 may identify a target entity 108 to attack. In particular, the command and control 106 may direct the botnet 104 to perform a distributed denial of service (DDoS) attack on the target entity 108. In the examples illustrated herein, the DDoS attack may be a TCP flooding or UDP flooding attack.

Note that while entities are shown in the cloud 100, botnets may be virtual entities on a cloud and/or could be on-premises entities at a datacenter. Thus, the embodiments illustrated herein may be used in cloud environments, on-premises environments, or combinations of the two.

FIG. 1 illustrates that the cloud environment 100 hosts a botnet classifier portion 110 that is configured to identify entities from the set of entities 102 that are part of a botnet, such as the botnet 104.

Embodiments can implement a combination of supervised (i.e., machine learning) and unsupervised approaches for classifying entities on the botnet classifier portion 110.

In this way, an improved computing system can be implemented that automatically groups entities in a cloud computing system. When entities are automatically identified as part of a botnet, those entities can have remedial measures performed to prevent the systems from continued participation in the botnet. This results in an improved cloud system which can use computing and cloud resources to perform useful tasks rather than the deleterious tasks associated with a botnet.

For the supervised approach, embodiments may use machine learning to train one or more supervised classifier portions 112 in the botnet classifier portion 110 that classify entities based on features derived from data flow protocol information, such as IPFix data. Embodiments can include classifiers for various types of DDoS attacks. For example, embodiments may include classifiers for TCP (SYN) Flooding and/or UDP Flooding. To train classifier portions, embodiments may use training data sets and testing data sets to create a model. The training and testing data sets may be based on captured data for various features as described below. In particular, the training data set is used to train a computer implemented classifier (i.e., a model). And a testing set may be used to verify the classifier. The classifier can then be used in an automated classification process to classify entities based on their network traffic generated and/or other characteristics.

To create such classifiers, embodiments may extract various features. For example, such features may include the ratio of outgoing to incoming flows, ratio of SYN messages among TCP traffic and/or number of destination IPs.

The following illustrates some specific TCP features that may be used:
Percent of outgoing messages with only SYN flag active
Number of outgoing messages with only SYN flag active
Natural logarithm of number of messages with only SYN flag active
Ratio of incoming and outgoing TCP messages
Hourly standard deviation of volume of TCP traffic
Number of outgoing TCP flows
Natural logarithm of hourly maximum of TCP traffic
Ratio between outgoing traffic and number of destination IPs (TCP)
Hourly maximum of TCP traffic
Natural logarithm of hourly standard deviation of TCP traffic The following illustrates various UDP features that may be used:
Hourly maximum of UDP traffic
Number of outgoing UDP flows
Natural logarithm of hourly maximum of UDP traffic
Ratio between outgoing traffic and number of destination IPs (UDP)
Natural logarithm of number of outgoing UDP flows
Natural logarithm of number of distinct destination IPs addressed
Number of distinct destination IPs addressed
Natural logarithm of number of incoming UDP flows
Ratio of incoming and outgoing UDP messages
Hourly standard deviation of volume of UDP traffic For the unsupervised approach, for each classifier, unsupervised entity classifier portions 114 select a top number of features. For example, this may be done by random forest feature importance ranking and training a random forest on a labeled dataset, although, any one of a number of different feature selection and classification algorithms can be used. Generally, feature selection can be performed by filtering using any one of a number of different statistical tests. For example, the t-test may be used generally. In another example for a binary classification algorithm, logistic regression may be used. A number of features are selected as classifiers. These classifiers are then used to calculate a probability score, referred to herein as DDOS_PROB, for each entity. This probability is the probability that this entity is performing DDoS attacks.

In the embodiments illustrated herein, there are two probabilities for each entity—one for TCP flooding and one for UDP flooding. These probabilities are used to independently detect both TCP and UDP DDoS botnets.

The botnet classifier portion 110 examines cluster entities based on their outgoing traffic. To do so, embodiments initially filter out entities with DDOS_PROB that is smaller than some predetermined threshold, illustrated herein as SCAN_THRESHOLD. This allows embodiments to greatly reduce the number of candidate entities and avoid false positives.

Assume that after filtering, embodiments identify M entities. Additionally, there is a set of N destination IPs to which these entities have outgoing traffic. Embodiments construct a summary matrix such that the i,j entry represents the number of messages from an entity (j, in this example, which is often on the order of thousands) to an IP (i, in this example, which is often on the order of millions). Embodiments filter out entries that are smaller than some predetermined threshold, referred to herein as MIN_THRESHOLD, and remove rows that have less than some predetermined target, referred to herein as MIN_TARGETS, nonzero entries.

This matrix can be used to perform hierarchical clustering to cluster similar entities together. Thus, characteristics about one entity in a cluster of entities can be used to characterize the other entities in the cluster of entities. Thus, for example, embodiments may be able to identify a cluster of entities where all of the entities in the cluster are part of a particular botnet. Alternatively or additionally, embodiments may be able to identify a cluster of entities that are all under the same command and control (e.g., command and control 106). Alternatively or additionally, embodiments may be able to identify a cluster of entities that are all infected with the same malicious software. Etc. Some embodiments use correlation as a distance metric and average as a linkage criteria.

Embodiments can attempt to find an optimal number of clusters. In some embodiments, this can be performed, for example, using various data clustering algorithms.

However, this optimal number of clusters is a heuristic. Thus, other embodiments could include selecting the number manually by some visualization However, automating using numerical analysis as illustrated above may be more efficient. Embodiments may assume that every cluster is a botnet. If too low of a number-of-clusters is used, embodiments group more than one botnet into a cluster. In contrast, when embodiments use too high of a number-of-clusters, embodiments will split the same botnet into several cluster. Note that both type of errors can still happen even with the right number of clusters, but will ideally be minimized.

Figure 2:
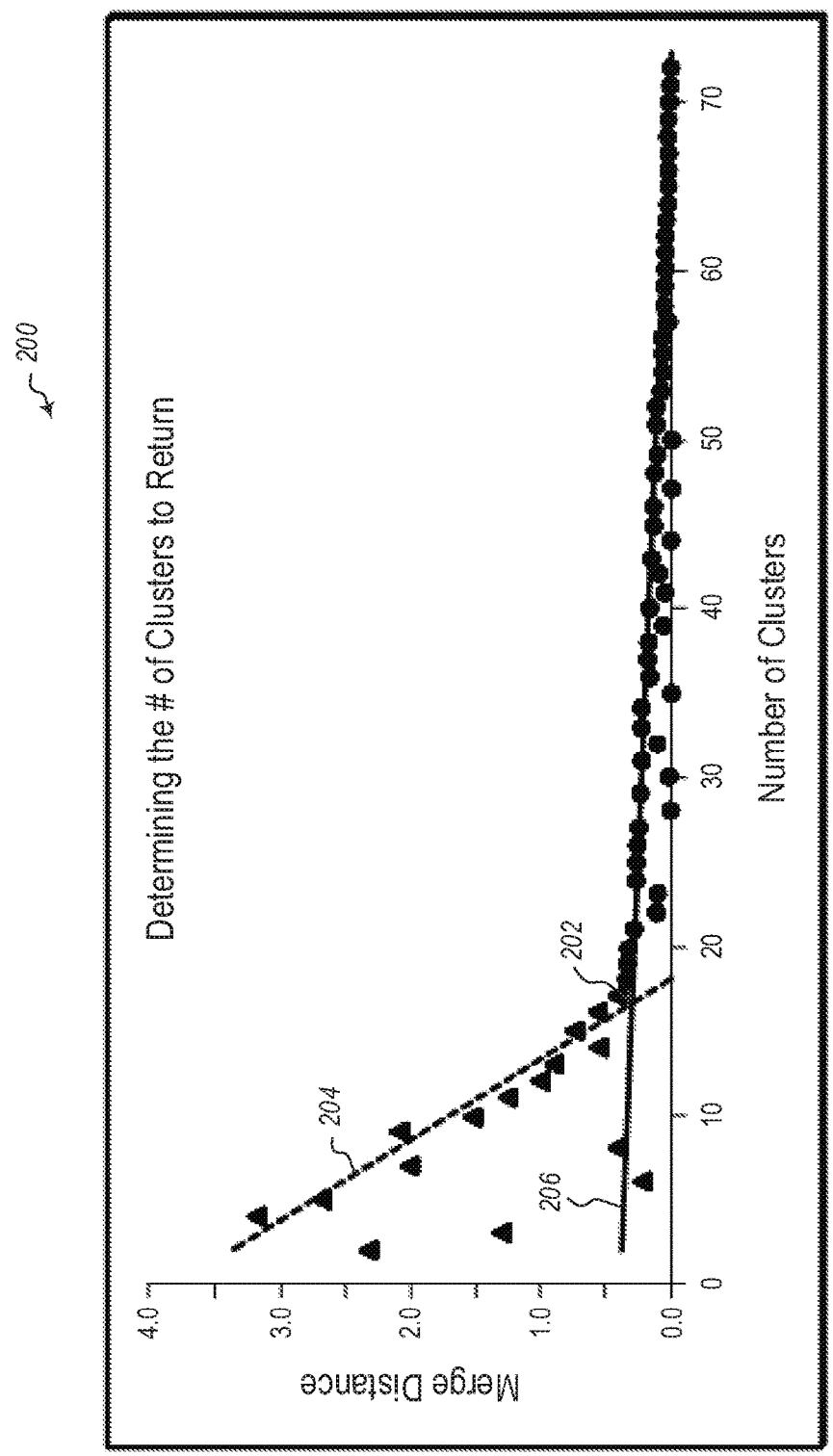
FIG. 2 illustrates a graph illustrating functionality for determining a number of clusters to return for a botnet classification system.

One such method uses the L-method proposed by Salvador and Chan. An example is illustrated in FIG. 2. As illustrated in the graph 200, an optimal number of clusters is found by the intersection 202 of the two lines 204 and 206 that best fit the graph of merge distance vs number of clusters, respectively.

Various other methods may be used additionally or alternatively. For example, some embodiments may use the elbow method, which attempts to cluster based on the percentage of variance as a function of the number of clusters. Alternatively or additionally, embodiments may use x-means clustering which clusters by attempting subdivisions and keeping desired sub-divisions according to some predetermined criteria. Alternatively or additionally, embodiments may use information criterion approaches, such as the Akaike information criterion, Bayesian information criterion, or the Deviance information criterion to identify likelihood function for clustering models. Alternatively or additionally, embodiments may use an information theoretic approach by attempting to determine a number of clusters while attempting to minimize errors according to certain information theoretic standards. Alternatively or additionally, embodiments may use the silhouette method which examines the similarity of data within a cluster and how loosely it matches neighboring clusters. Alternatively or additionally, embodiments may use cross-validation. Alternatively or additionally, embodiments may analyze a kernel matrix.

Embodiments can then use a supervised entity classifier portion 112 again to classify the clusters as DDoS botnets. In particular, clusters that contain at least one entity for which some identified probability, referred to herein as DDOS_PROB, is bigger than a threshold, referred to herein as CONFIDENT_DDOS, are classified as DDoS botnets.

Thus, embodiments include functionality to efficiently detect DDoS botnets in cloud systems. Specifically embodiments combine supervised and unsupervised approaches to efficiently retrieve botnets from protocol data, such as IPFix data on, potentially, hundreds of thousands of entities. This approach enables the identification of compromised entities that are difficult to identify by relying only on single entity classification. It is also useful for the investigation of attack flows on the cloud or on on-premises networks. Additionally, by returning a group of clusters, the clusters can be identified by various similarities as will be illustrated in more detail below. For example, embodiments may identify that similar entities in a cluster are all performing DDoS attacks. Alternatively or additionally, embodiments may identify that similar entities in a cluster are all in the same botnet. Alternatively or additionally, embodiments may identify that similar entities in a cluster are all under the same command and control. Alternatively or additionally, embodiments may identify that similar entities in a cluster are all infected with the same virus software.

Some embodiments may use available external data to identify a particular botnet. Additionally, embodiments may perform remedial actions for entities in a cluster when one or more other entities in a cluster exhibit certain traits. For example, some embodiments may use threat intelligence (TI) streams. Thus, for example, if there are TI hits on several machines in a given cluster, embodiments can alert the rest of the machines in the cluster of the same threat. Alternatively or additionally, if there are several machines in a cluster performing some sort of outgoing activity, like a brute force attack, other machines in the same cluster might start performing the same activity in the near future. Remedial measures, such as network traffic blocking, notifying administrators, etc., can be performed to prevent this activity.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
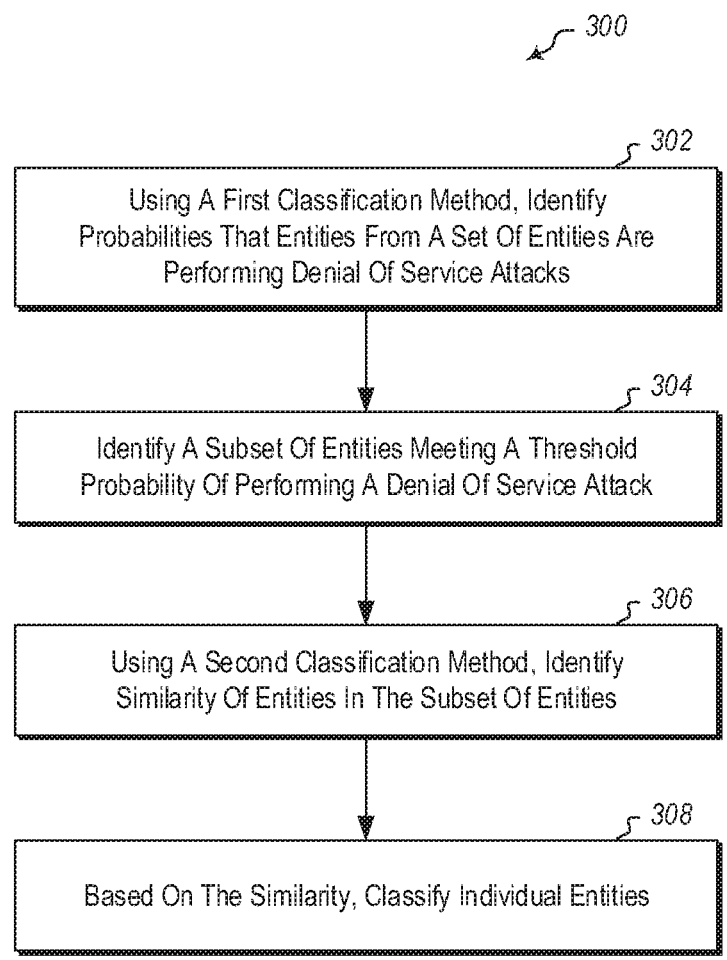
FIG. 3 illustrates a method of identifying or classifying entities to increase confidence with respect to an entity being part of a distributed denial of service attack.

Referring now to FIG. 3, a method 300 is illustrated. The method 300 may be a computer implemented method which includes acts for training a classifier for identifying or classifying entities to increase confidence with respect to an entity being part of a distributed denial of service attack. The method 300 includes, using a first classification method, identifying probabilities that entities from a set of entities are performing denial of service attacks (act 302). For example, in some embodiments the classification method may be a supervised classification method. In particular, embodiments may train a classifier, using machine learning techniques, to use a first classification method, to identify probabilities that entities from a set of entities are performing denial of service attacks.

The method 300 further includes identifying a subset of entities meeting a threshold probability of performing a denial of service attack (act 304). In some embodiments, medium to high probabilities may meet the threshold.

The method 300 further includes, using a second classification method, identifying similarity of entities in the subset of entities (act 306). In some embodiments, the second classification method may be an unsupervised method.

The method 300 further includes, based the similarity, classifying individual entities (act 308).

The method 300 may be practiced where the second classification method clusters similar entities into similarity clusters. In some such embodiments, the method 300 may further include identifying a cluster as a set of compromised entities. For example, a similarity cluster may be identified where all entities in the cluster have been compromised and are performing DDoS attacks. Thus, the method 300 may be practiced where classifying individual entities comprises identifying entities as performing denial of service.

Embodiments may be implemented where similarities can be identified for entities that are grouped together in a similarity cluster. For example, the method 300 may further include identifying entities in a particular botnet based on similarity. Thus, embodiments may be able to identify all or parts of a botnet based on similarity.

Alternatively or additionally, the method 300 may further include identifying entities infected by the same means based on similarity. Thus, for example, embodiments may be able to identify entities infected using the same malicious software, such as the same virus software. Alternatively or additionally, embodiments may be able to identify entities infected and having the same command and control, i.e., the entities are infected by or for the same attacker.

The method 300 may be practiced where using a second classification method, to identify similarity of entities in the subset of entities comprises using the L-method.

Alternatively or additionally, the method 300 may be practiced where using a second classification method (e.g., an unsupervised method), to identify similarity of entities in the subset of entities comprises using hierarchal clustering. In some such embodiments, the method 300 further includes correlating entity activity. In some such embodiments, using hierarchal clustering is based on correlated entity activity.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured to train and use a classifier to classify entities to determine whether the entities are part of a distributed denial of service (DDoS) attack, the system comprising:
   one or more hardware processors; and
   one or more computer-readable storage devices having stored thereon instructions that are executable by the one or more hardware processors to configure the system to perform at least the following:
   train a classifier to use a first classification method to identify probabilities that entities are performing denial of service attacks, the training comprising applying a captured dataset including data flow protocol information associated with known DDoS attacks;
   using the trained classifier, identify a subset of entities from a set of candidate entities that meet or exceed a threshold probability of performing a denial of service attack;
   using a second classification method, identify similarity of entities in the identified subset of entities; and
   based on the similarity, classify individual entities of the subset of entities as belonging to one or more similarity subgroups, each similarity subgroup comprising entities having a probability of participating in a same DDoS.

2. The system of claim 1, wherein the second classification method clusters similar entities into similarity clusters.

3. The system of claim 2, wherein the one or more computer-readable storage devices further have stored thereon instructions that are executable by the one or more hardware processors to configure the computer system to identify a cluster as a set of compromised entities.

4. The system of claim 1, wherein classifying individual entities comprises identifying entities as performing denial of service.

5. The system of claim 1, wherein the one or more computer-readable storage devices further have stored thereon instructions that are executable by the one or more hardware processors to configure the computer system to identify entities in a particular botnet based on similarity.

6. The system of claim 1, wherein the one or more computer-readable storage devices further have stored thereon instructions that are executable by the one or more processors to configure the computer system to identify entities infected by the same means based on similarity.

7. The system of claim 6, wherein the same means comprises the same malicious software.

8. The system of claim 6, wherein the same means comprises the same command and control.

9. The system of claim 1, wherein using the second classification method, to identify similarity of entities in the subset of entities comprises using the L-method.

10. The system of claim 1, wherein using the second classification method, to identify similarity of entities in the subset of entities comprises using hierarchal clustering.

11. The system of claim 1, wherein the one or more computer-readable storage devices further have stored thereon instructions that are executable by the one or more hardware processors to configure the computer system to correlate entity activity and wherein using hierarchal clustering is based on correlated entity activity.

12. The system of claim 1, wherein the one or more computer-readable storage devices further have stored thereon instructions that are executable by the one or more hardware processors to configure the computer system to use available external data to identify a particular botnet.

13. A computer implemented method for training a classifier for classifying entities to determine whether the entities are part of a distributed denial of service (DDoS) attack, the method comprising:
training a classifier to use a first classification method to identify probabilities that entities are performing denial of service attacks, the training comprising applying a captured dataset including data flow protocol information associated with known DDoS attacks;
using the trained classifier, identifying a subset of entities from a set of candidate entities that meet or exceed a threshold probability of performing a denial of service attack;
using a second classification method, identifying similarity of entities in the subset of identified entities; and
based on the similarity, classifying individual entities of the subset of entities as belonging to one or more similarity subgroups, each similarity subgroup comprising entities having a probability of participating in a same DDoS.

14. The method of claim 13, wherein the second classification method clusters similar entities into similarity clusters.

15. The method of claim 14, further comprising identifying a cluster as a set of compromised entities.

16. The method of claim 13, wherein classifying individual entities comprises identifying entities as performing denial of service.

17. The method of claim 13, further comprising identifying entities in a particular botnet based on similarity.

18. The method of claim 13, further comprising identifying entities infected by the same means based on similarity.

19. The method of claim 18, wherein the same means comprises the same malicious software.

20. A computer system configured to use a trained classifier to classify entities to determine whether the entities are part of a distributed denial of service (DDoS) attack, the system comprising:
a botnet classifier coupled to a plurality of computing entities, the botnet classifier comprising one or more computer processors, wherein the botnet classifier is configured to:
capture data flow protocol information from the entities in the plurality of entities;
provide the captured data flow protocol information from the entities to a trained classifier, the trained classifier having been trained by applying previously captured data including data flow protocol information associated with known DDoS attacks;
the trained classifier implementing a first classification method to identify probabilities that entities are performing denial of service attacks based on the captured data flow protocol information;
identify a subset of entities from a set of candidate entities that meet or exceed a threshold probability of performing a denial of service attack;
use a second classification method, identify similarity of entities in the identified subset of entities; and
based on the similarity, classify individual entities of the subset of entities as belonging to one or more similarity subgroups, each similarity subgroup comprising entities having a probability of participating in a same DDoS.

* * * * *